United States Patent [19]
Sugita et al.

[11] 4,207,063
[45] Jun. 10, 1980

[54] APPARATUS FOR MOLDING HOLLOW OBJECTS OF THERMOPLASTIC RESINS

[75] Inventors: Yasunori Sugita, Tokyo; Yokichi Miyara, Yokohama, both of Japan

[73] Assignee: Mitsui Toatsu Chemicals, Inc., Tokyo, Japan

[21] Appl. No.: 930,653

[22] Filed: Aug. 3, 1978

Related U.S. Application Data

[60] Division of Ser. No. 759,547, Jan. 14, 1977, abandoned, which is a continuation of Ser. No. 557,985, Mar. 13, 1975, abandoned.

[51] Int. Cl.² ............................ F27D 3/00; F27B 9/14
[52] U.S. Cl. .................................... 432/124; 219/388; 219/411; 432/11
[58] Field of Search .................. 432/124, 11; 219/388, 219/411

[56] References Cited
U.S. PATENT DOCUMENTS

| 2,539,135 | 1/1951 | Hess | 432/124 |
|---|---|---|---|
| 3,249,741 | 5/1966 | Mills | 219/388 |
| 3,715,109 | 2/1973 | Gilbert | 219/388 |

Primary Examiner—John J. Camby
Attorney, Agent, or Firm—Fisher, Christen & Sabol

[57] ABSTRACT

A method for making plastic containers comprises the steps of heating an axially subdivided area of a tubular parison to a temperature higher than that of the remaining axially subdivided portion prior to forming the container in a mold. Apparatus for accomplishing such heating includes a furnace provided with an endless conveyor and an auxiliary heater along a certain portion of the path of the conveyor.

5 Claims, 6 Drawing Figures

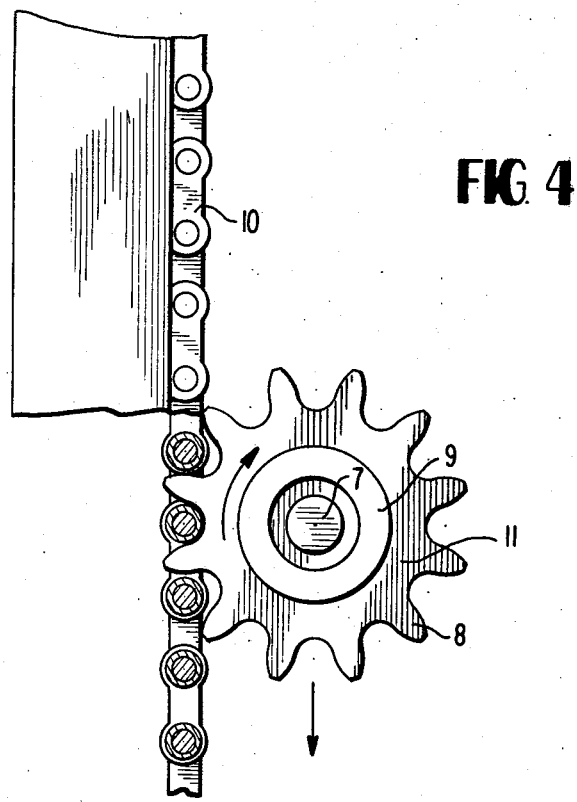
FIG. 4
FIG. 5
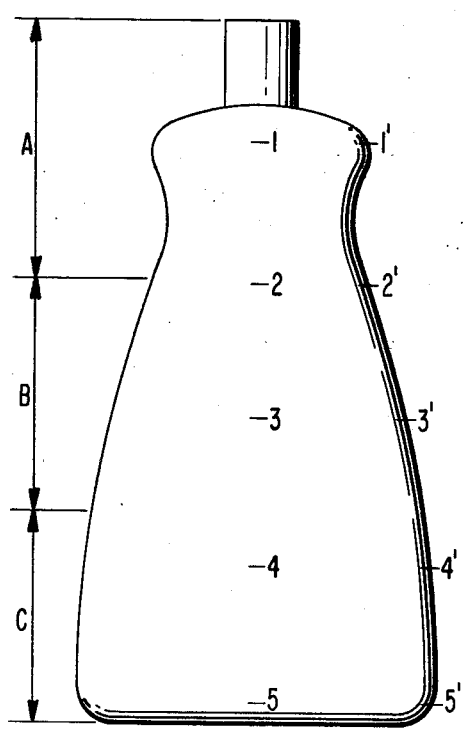
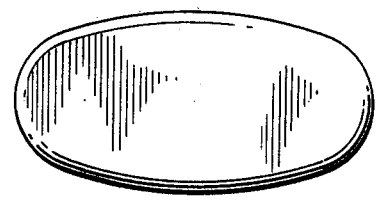
FIG. 6

APPARATUS FOR MOLDING HOLLOW OBJECTS OF THERMOPLASTIC RESINS

This application is a division of application Ser. No. 759,547, filed Jan. 14, 1977, now abandoned, which is a continuation of application Ser. No. 557,985, filed Mar. 13, 1975, now abandoned.

A method for molding a hollow object of a thermoplastic resin wherein said hollow object is molded by heating a solid parison of a thermoplastic resin and then blowing a pressurized fluid into the heated parison, characterized by heating said solid parison uniformly up to a temperature suitable for the stretching thereof, further heating certain portions in an axial direction of said solid parison uniformly in a circumferential direction, which correspond to shell and neck portions of said hollow object showing relatively small expansion ratios, in such a manner that the temperature of said certain portions are made higher by 1° to 5° C. than the temperature of the remaining portions corresponding to shell and bottom portions of said hollow object which are relatively great in expansion ratios, and subjecting the thus heated parison to axial stretching and blowing molding treatments.

An apparatus for molding a hollow object of a thermoplastic resin comprising a parison heating device which is provided to uniformly heat up to a predetermined molding temperature each of continuously fed solid parisons, which are vertically supported and which are made of a thermoplastic resin, during circulatingly feeding operations and which incorporates therein an auxiliary heating means movable up and down in a vertical direction and controllable in quantity of heat, said each of solid parisons being allowed to rotate about its central axis and certain portions in an axial direction of said each of solid parisons being uniformly heated in a circumferential direction in such a manner that the temperatures of said certain portions in an axial direction are made higher than the remaining portions thereof when said each of solid parisons is passed by said auxiliary heating means, and a stretching and a blowing devices.

DETAILED DESCRIPTION OF THE INVENTION

This invention relates to a method for molding hollow objects of thermoplastic resins and an apparatus for making such hollow objects, and more particularly, to a method and apparatus for molding hollow objects of thermoplastic resins wherein each of solid parisons is heated in a manner as to have proper temperature differences in the respective axial portions of the solid parison so that the resultant hollow object is suitable controlled in thickness in a lengthwise direction.

In general, methods of blow-molding thermoplastic resins can be broadly classified into three categories, i.e., a cold parison molding method, a hot parison molding method and a cold sheet molding method. Most of hollow materials or objects are now produced by a cold or hot parison molding method using resin tubes or so-called "parisons". In this sense, this invention concerns a cold parison molding method or a biaxially stretching and blow-molding method (hereinafter referred to simply as stretch and blow molding) which comprises a parison producing step and a heating, stretching and blowing step.

In the case where plastic containers which have a flat or irregular form in section, or the diameter and sectional area of which vary to a great degree in a lengthwise direction, are produced by a hot parison molding method, the thickness of ultimately desired moldings is made uniformly by suitably controlling the thicknesses of portions of a molten parison, which is extended by means of an extruder or which is produced by the use of an injection molding machine, according to the shape of the ultimate moldings. That is, upon the extrusion of a molten parison, a die or core which has an angle with respect to an extruding direction is moved vertically for changing the clearance between dies and cores thereby to arbitrarily control or change the thicknesses of a molten parison in a lengthwise direction (i.e., a parison-thickness control method). Furthermore, the control of thickness of a molten parison in the circumferential direction can be achieved by the use of a flat or deformed extrusion die or core, so that it is possible to produce a container which has greatly different diameters in the respective shell portions thereof without unnecessarily increasing the weight of container, or to form a container, which is flat or deformed in section, with a uniform thickness in all portions of the container, or to make uniform the bottom thereof which is generally apt to turn thin.

In a cold parison molding system which comprises a parison producing step and a blowing step, the two steps being independent each other, it is general to product parisons by continuously extruding cylindrical pipes, followed by cutting, so that it is almost impossible to change or control in a lengthwise direction the thickness of parison in accordance with the shape of an ultimate container product. Furthermore, the control of thickness in the circumferential direction does not prevail to such an extent as in the hot parison molding system since it is difficult to place in position in a metal mold a cut parison with a thickness which varies in the circumferential direction, requiring a complicated apparatus. Accordingly, in case where containers having irregular shpaes in section are molded by a cold parison molding method without controlling the thickness of parison, extremely thin wall portions may be formed in such irregularly shaped containers. To avoid this, it is necessary to undesirably increase the entire thickness of the staring parisons to a greater extent, so that the ultimate containers disadvantageously increase in weight, resulting in increase in production costs and reduction in transparency of the containers.

Especially with a stretch and blow molding system wherein a blow molding temperature is low, a parison becomes poor in moldability and accordingly, upon expansion by blowing, the thicknesses of certain portions of the parison, which are not in contact with a metal mold at an initial stage of the expansion, i.e., long span portions of a container with a flat or deformed section and a great diameter shell portion and a bottom portion of a container which has different shell diameters therein or which is formed by a wide range of expansion ratios, are made extremely thin, the resultant container having an extremely non-uniform thickness distribution.

In accordance with this invention, there is provided a method for producing hollow objects made of thermoplastic resins, characterized by uniformly heating a parison by means of a heating device, which is obtained in a thermoplastic resin parison producing step without locally changing the thickness of the parison, up to a temperature suitable for the stretching thereof, further heating by an auxiliary heating means certain portions with respect to the axial direction of the parison corresponding to the shell and neck portions having smaller diameters in the final container product, in such a manner that the temperatures of said certain portions in the axial direction of the parison are made higher by 1° to 5° C. than the temperature of the remaining portions corresponding to the shell and bottom portions having greater final diameters which are relatively great in expansion ratios and which tend to turn thin in thickness; then subjecting the resultant parison to stretching and blowing treatments, whereby the thus heated parison has differences in degree of deformation and moldability between the portions heated in different ways when treated under the same stress in the stretching and blowing step, resulting in the formation of a final container having a uniform thickness distribution.

An apparatus of this invention is characterized in that the above-mentioned auxiliary heating means is provided within the parison heating device, the parison being first uniformly heated by means of the parison heating furnace and thereafter the certain portions with respect to the axial direction of the parison being further heated by the auxiliary heating means while the parison is rotated for producing predetermined temperature differences in the parison which are uniform in the circumferential direction while varying with respect to each other in the axial direction. A known stretcher and a fluid-blowing means are provided for axially stretching the heated parison, followed by blowing thereinto a pressurized fluid or air mold.

The thermoplastic resins useful in the present invention are all of thermoplastic resins capable of blow-molding by the cold parison molding method and are particularly inclusive of high density polyethylene, low density polyethylene, polypropylene, polyvinyl chloride, polyvinylidene chloride and the like. These thermoplastic resins may be used in combination with a thermoplastic resin of a different type in the laminated form.

This invention is very effective when applied to the production of containers the shell diameter of which varies in a lengthwise direction, e.g., a container having a conical form or a container with a narrow shell part. However, this invention is not limited to the production of containers with such specific forms or shapes and is also effective for the production of general cylindrical containers with the bottom being made strong and uniform in thickness. The heating source of the auxiliary heating means is not limited to a specific type but may be an infrared heater, a silica tube heater, a far infrared heater, a hot air generator, a steam heating device and the like.

While the heating source of the heating device which includes therein the auxiliary heating means is not limited to those of a specific type as well and may be the same type of heating source as used in the auxiliary heating means. In either case, the heating source is required to precisely control the temperature within 1° C.

Where the temperature difference in the axial direction of the parison attained by using the auxiliary heating means is smaller than 1° C., it is difficult to make uniform the thickness of a final product and the maintenance of such small temperature difference will be almost impossible. On the contrary, with the temperature difference in excess of 5° C., good molding products can not be obtained since the portions heated by the auxiliary heating means are expanded to an excessive extent and so-called "necking" will take place.

The heating device is required to be so designed as to vertically support parisons upon respective supporting pins and to be capable of circulatingly feeding or conveying the parisons through the heating device. Furthermore, when the parisons pass by the auxiliary heating means, it is necessary to permit the parisons to rotate together with the respective supporting pins so that the parisons are uniformly heated in a circumferential direction.

This invention will be particularly illustrated by the following detailed description and accompanying drawings, in which:

FIG. 4 is a plan view taken along the line C—C in FIG. 3;

FIG. 5 is a front view of a hollow object obtained in accordance with the invention; and FIG. 6 is a bottom view of the container of FIG. 5.

Figure 1:
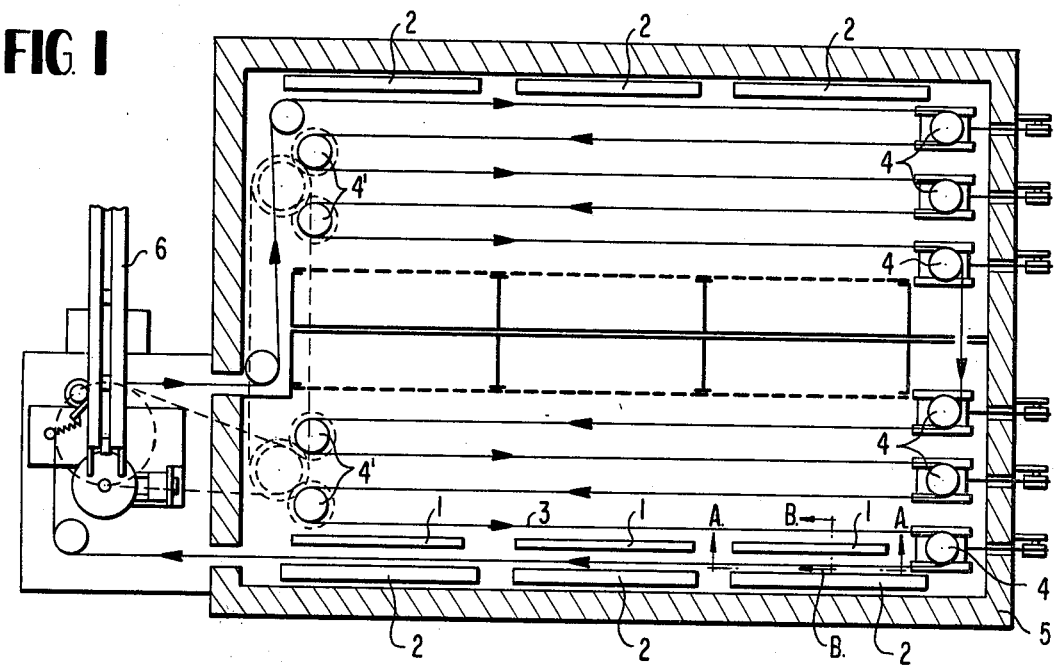
FIG. 1 is a plan view of a preferred form of heating device embodying the present invention.
Figure 2:
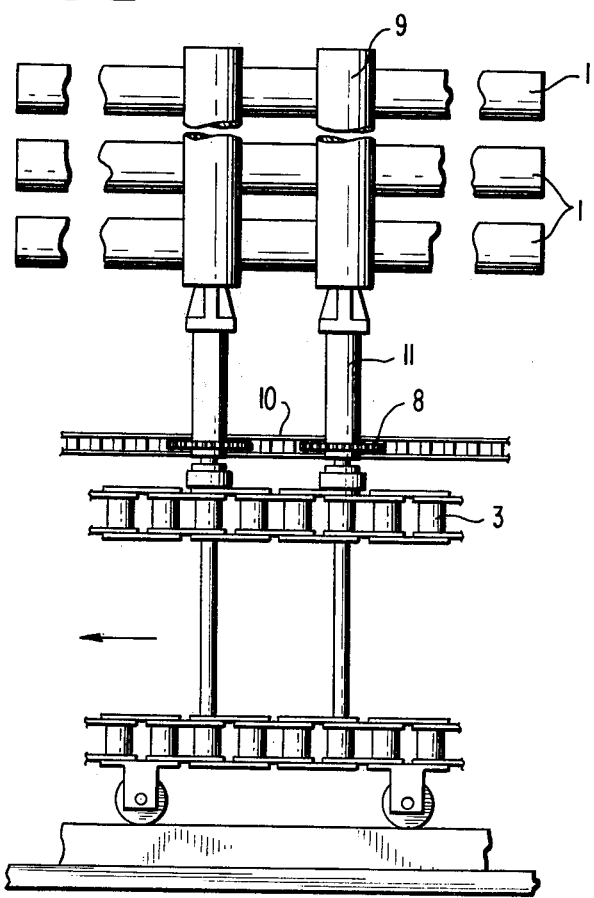
FIGS. 2 and 3 are vertical sectional views taken along the lines A—A and B—B in FIG. 1.
Figure 3:
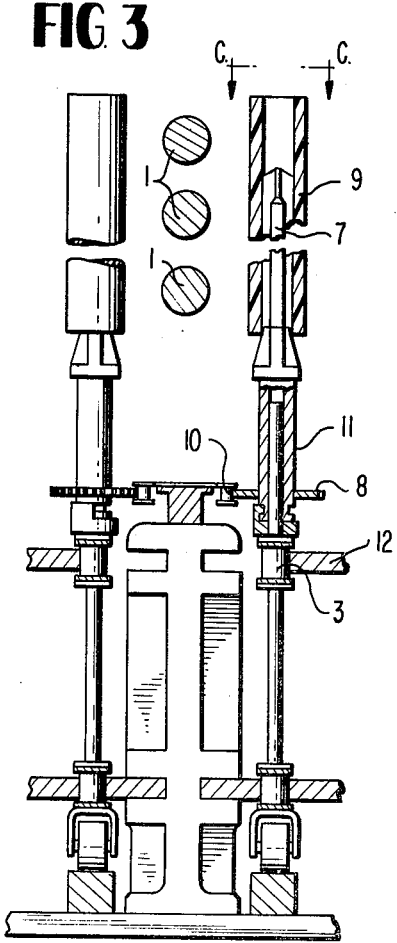

FIG. 1 is a plan view of a heating device and an auxiliary means embodying the present invention, in which indicated at 1 is the auxiliary heating means, at 2 a hot air generating port of the heating device, at 3 a parison conveying or feeding chain, at 4 and 4' axes for returning the conveying chain 3, at 5 a heating furnace and at 6 means for introducing a parison into the heating furnace 5;

FIGS. 2 and 3 are vertical sectional view taken along the lines A—A and B—B in FIG. 1, respectively, in which views indicated at 7 is a parison supporting pin, at 8 a gear for rotating the supporting pin 7, at 9 a parison, at 10 a fixed sprocket mating with the gear 8, at 11 a shaft supporting the pin 7 and at 12 a chain guide;

Referring now to FIGS. 1, 2, 3 and 4, the chain 3 which carries the parison supporting pins 7 is endless and circulatively runs in the direction of the arrows shown in FIG. 1. The heating furnace 5 is entirely uniformly heated up to a predetermined molding temperature T by hot air which is blown thereinto through the hot air generating ports 2. The parison 9 which is put on the supporting pin 7 with the aid of the parison introducing means 6 is fed through the heating device for uniformly heating the entirety thereof and comes to the position where it encounters the auxiliary heating means 2 on its next to last pass of the conveyor means. The auxiliary heating means 1 is, for example, sets of three far infrared heaters which are set in position to heat the upper, middle and lower portions of the parisons, respectively, and which are adjustably mounted to be movable up and down in a vertical line. Moreover, the auxiliary heaters are respectively connected to voltage regulators to suitably control the quantity of heat. The parison 9 which is mounted on the supporting pin 7 is fed through the furnace in the direction of the arrows while allowing it to rotate at a constant rotational frequency by means of the gear 8 and the fixed sprocket in a mating relation, during which certain portions of the rotating parison are further for a predetermined period of time by the auxiliary heating means. As a result, the upper, middle and lower portions or parts of the parison is uniformly heated in a circumferential direction up to a temperatures of $(T+t_1)$°C., $(T+t_2)$°C. and $(T+t_3)$°C., respectively. The thus heated parison is then fed to a subsequent blowing step or a stretching and blowing step to shape the same into a desired form.

EXAMPLE

Polypropylene having a density of 0.900 g/cc (at 20° C.) and a melt index of 0.5 g/10 min (ASTM-D-1238-62T) was used as a raw material for producing by means of an extruder and a parison cutter each having an outer diameter of 22 mm, a thickness of 5 mm, an inner diameter of 12 mm and a length of 120 mm. The resultant parison was heated to 155° C. (hereinafter referred to as T° C.) by the use of the heating device of FIG. 1. The upper portion (i.e., A portion (expansion ratio 1.6) in FIG. 5) of the parison was further heated by the auxiliary heating means up to T+4° C., the middle portion (i.e., B portion (expansion ratio 2.3) in FIG. 5) up to T+2° C., but the lower portion (i.e., C portion (expansion ratio 3.0) in FIG. 5) was not supplementarily heated. The thus heated parison was withdrawn from the furnace and the ends of the parison were grasped by conventional apparatus for stretching the parison by about 2.5 times as long at a constant rate in the direction of a tube axis. The thus stretched parison was immediately placed in a metal mold having an internal configuration as shown in FIGS. 5 (front view) and 6 (bottom view), and a pressurized fluid, such as air, was blown into the parison to mold a container. The thickness distribution of the container which was obtained by the use of the auxiliary heating means in accordance with the present invention is shown in the Table below in comparison with that of a container obtained as a result of conventional uniform heating. The measured points are indicated by numerals corresponding to those of FIG. 5.

| Measured Point | Thickness (mm) | | | |
|---|---|---|---|---|
| | Container of invention | | Container of prior art | |
| | Front | Side | Front | Side |
| 1 | 1.0 | | 1.2 | |
| 2 | 1.0 | | 1.1 | |
| 3 | 1.0 | | 0.9 | |
| 4 | 0.9 | | 0.8 | |
| 5 | 0.8 | | 0.6 | |
| 1' | | 0.5 | | 0.8 |
| 2' | | 0.6 | | 0.6 |
| 3' | | 0.5 | | 0.4 |
| 4' | | 0.5 | | 0.3 |
| 5' | | 0.4 | | 0.1 |

It will be apparent from the Table that the thickness distribution of the container of this invention is markedly uniform when compared with the container which is obtained from the same kind of parison uniformly heated by a conventional manner.

As for the molding of containers of different shapes, the almost same results can be obtained by suitable control of heating intensity, heating position and heating time. It should be noted that the above-described specific apparatus is intended to merely illustrate one preferred embodiment of the present invention. Various modifications may be made without departing from the scope of this invention.

What is claimed is:
1. Apparatus for heating tubular parison having walls of substantially uniform thickness comprising:
   (a) a furnace provided with a source of hot air to heat said parison to a predetermined uniform temperature;
   (b) conveyor means for transporting tubular parisons along a circuitous path in said furnace;
   (c) said conveyor means including a series of support means for holding each of said parisons in vertical positions for rotation about their respective central axes while being transported along said path, the next to last pass and the last pass in said path being in parallel spaced relationship;
   (d) said furnace also including horizontally extending narrow infra red heating means disposed parallel to and between the length of said next to last and last passes of said circuitous path for heating an axially subdivided portion of a parison to a temperature different from that of the remainder of the parison while moving along said passes;
   (e) and means for rotating a support means for a parison while exposed to said auxiliary heating means.

2. The invention defined in claim 1 wherein said auxiliary heating means includes means for heating at least two axially subdivided portions of the parison to temperatures different from each other and from that of the remainder of the parison.

3. The invention defined in claim 1 wherein said conveyor means includes endless chain means, said chain means being guided to move in one direction spaced horizontally from one side of said auxiliary heating means during the next to last pass and in the opposite direction spaced horizontally from the other side of said heating means during the last pass.

4. The invention defined in claim 3 wherein said support means includes a shaft including a gear rotatably journaled on said chain means, and fixed sprocket means engaging with said gear along said predetermined path.

5. The invention defined in claim 3 wherein said support means includes shaft means journaled on said chain means for rotating a parison about a vertical axis, said auxiliary heating means including at least two elongated heating means disposed in vertical superimposition.

* * * * *

UNITED STATES PATENT OFFICE
CERTIFICATE OF CORRECTION

Patent No. 4,207,063　　　　　Dated June 10, 1980

Inventor(s) Yasunori Sugita; Yokichi Miyara

It is certified that error appears in the above-identified patent and that said Letters Patent are hereby corrected as shown below:

Please change Assignee as follows:

"Mitsui Toatsu Chemicals, Inc.,
Tokyo, Japan"

to

--Mitsui Toatsu Chemicals, Inc.,
Tokyo, Japan, and
Kureha Kagaku Kogyo Kabushiki Kaisha,
Tokyo, Japan, a part interest each. --.

Signed and Sealed this

Ninth Day of December 1980

[SEAL]

*Attest:*

SIDNEY A. DIAMOND

*Attesting Officer*　　　*Commissioner of Patents and Trademarks*